United States Patent [19]

Stewart

[11] Patent Number: 4,738,519
[45] Date of Patent: Apr. 19, 1988

[54] WIDE ANGLED REAR VIEW MIRROR

[75] Inventor: Robert T. Stewart, Woodinville, Wash.

[73] Assignee: Wink Corporation, Lynnwood, Wash.

[21] Appl. No.: 56,608

[22] Filed: Jun. 1, 1987

Related U.S. Application Data

[63] Continuation-in-part of Ser. No. 731,366, May 7, 1986, Pat. No. 4,674,849.

[51] Int. Cl.⁴ ............................ G02B 5/08; G02B 5/10
[52] U.S. Cl. ..................................... 350/612; 350/611; 248/479; 248/475.1
[58] Field of Search ............... 350/600, 604, 605, 606, 350/610, 611, 612, 627, 631, 632; 248/466, 475.1, 476, 479, 481, 482, 484, 485

[56] References Cited

U.S. PATENT DOCUMENTS

| | | | |
|---|---|---|---|
| 2,763,187 | 9/1956 | Wiener | 350/627 X |
| 2,869,425 | 1/1959 | Kershaw | 350/627 |
| 3,408,136 | 10/1968 | Travis | 248/479 X |
| 3,411,843 | 11/1968 | Moller | 350/627 |
| 3,806,232 | 4/1974 | Gray | 350/627 X |
| 3,806,233 | 4/1974 | Stefano | 350/627 X |
| 4,023,029 | 5/1977 | Fischer | 350/600 |
| 4,344,672 | 8/1982 | Bleiweiss et al. | 248/475.1 X |
| 4,549,786 | 10/1985 | Albers et al. | 248/479 X |
| 4,575,202 | 3/1986 | McGuire | 350/627 |
| 4,678,294 | 7/1987 | Nostrand | 350/612 X |

Primary Examiner—Donald Watkins
Attorney, Agent, or Firm—Robert J. Schaap

[57] ABSTRACT

An auxiliary vehicle mirror device comprising a frame having a plurality of spaced apart rear view mirror panels enabling a wide angled view to the rear of a vehicle in which the device is used. The mirror device comprises a first attachment mechanism for attachment to a first fixed structure of the vehicle, as for example, the frame element surrounding an automotive vehicle windshield in the interior passenger compartment. The auxiliary vehicle mirror comprises a second attachment mechanism capable of being attached to a second fixed structure of the automotive vehicle, as for example, to a stud or the like secured to the vehicle windshield.

23 Claims, 2 Drawing Sheets

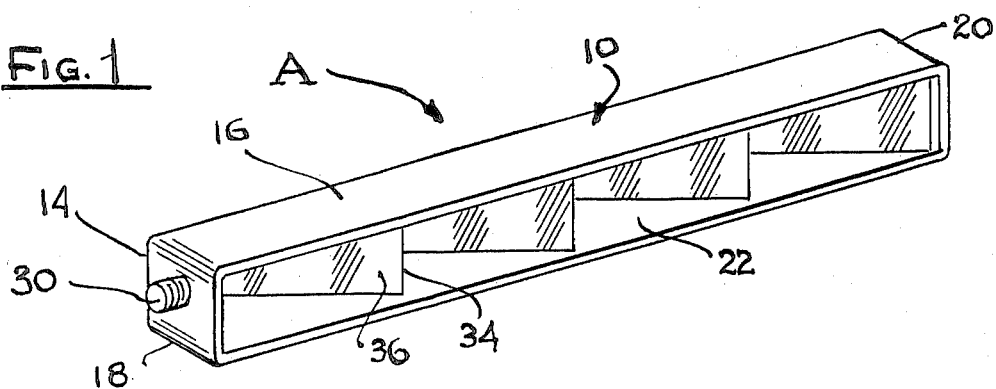
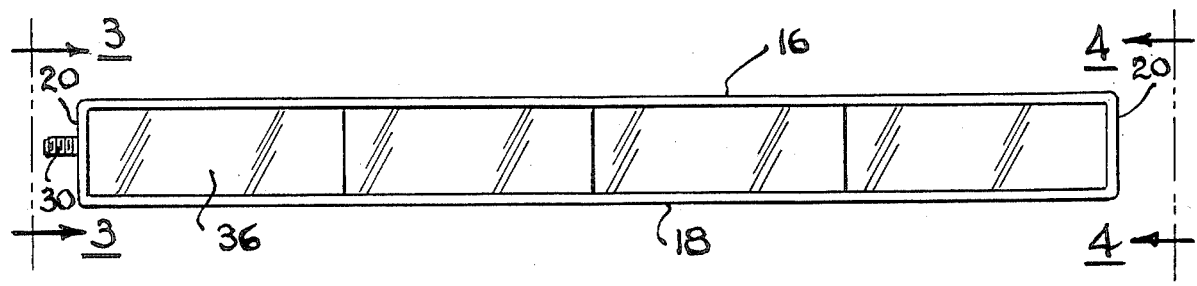
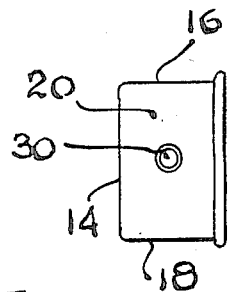
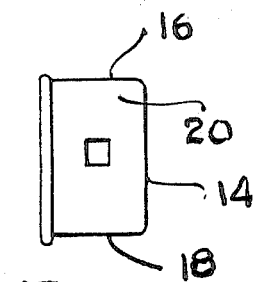
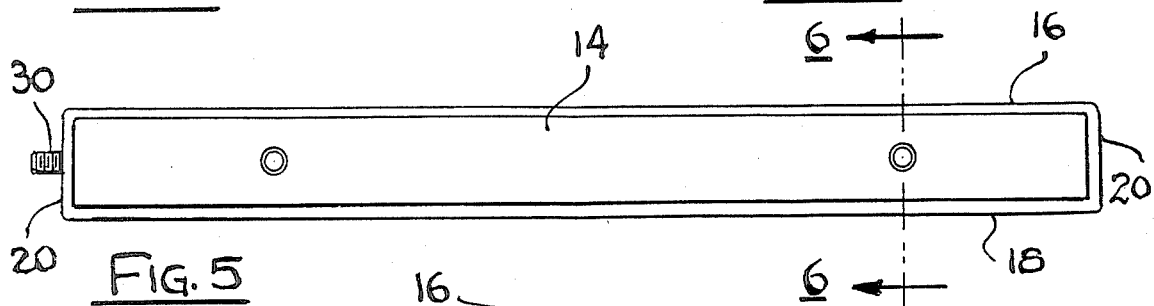
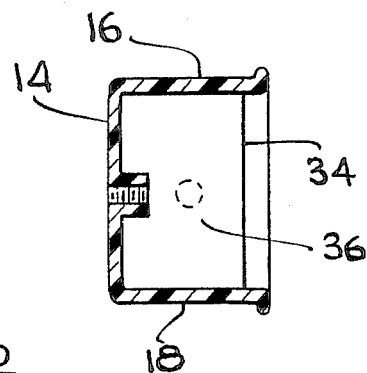

WIDE ANGLED REAR VIEW MIRROR

RELATED APPLICATION

This application is a continuation-in-part of my co-pending patent application Ser. No. 731,366, filed May 7, 1986 entitled "Vehicle Mirror", now U.S. Pat. No. 4,674,849, dated 6-23-87.

BACKGROUND OF THE INVENTION

1. Field of the Invention

This invention relates in general to certain new and useful improvements in vehicle mirrors, and more particularly, to auxiliary automotive vehicle mirrors which include a first attachment means for attachment to a first member of an automotive vehicle and a second attachment means for attachment to a second member on an automotive vehicle.

2. Brief Description of the Prior Art

Automotive vehicles are generally always provided with a rear view mirror in the passenger compartment of the vehicle to enable the driver to see traffic conditions rearwardly and to some extent on the sides of the vehicle. Generally, these rear view mirrors may be secured to the upper header which forms part of the roof structure of the vehicle. More often these rear view mirrors are secured to the front window pane or so-called "windshield" of the automotive vehicle.

These rear view mirror devices normally found in the automotive vehicles include a mirror frame which holds a mirror. The frame is connected to a mounting bracket on the windshield itself, or on the header portion of the roof structure of the vehicle. When secured to the windshield a bracket or so-called "button" is secured to the windshield and a threaded end of a stud is threadedly secured to the button. The opposite end of the stud is threaded for attachment to the frame.

In each of the aforesaid rear view mirror devices in automotive vehicles, the stud is a threaded rod section which is secured to the bracket or button and the latter is normally adhesively secured to the windshield or otherwise, it may be rigidly affixed to the header section of the roof structure of the vehicle.

It has been recognized that the so-called "wide angled rear view mirror" is an effective safety device for use in automotive vehicles for enabling the driver to obtain a clearer and more accurate image of the traffic conditions on the sides of and to the rear of the vehicle operated by a driver. These wide angled auxiliary mirrors usually include an elongate enlarge frame adapted to carry two or more side-by-side located mirror sections. However, most commercially available automotive vehicles do not include these wide angled mirrors and they are generally only available in the secondary automotive market or so-called "automotive after market". Thus, it is necessary for the user of these wide angled mirrors to be able to conveniently and easily attach any such wide angled mirror to some existing portion of the vehicle.

In some cases, these auxiliary wide angled mirrors have been provided with attachment devices on the rearward portion thereof for attaching to the interior portion of the automotive vehicle. However, if the commercially available wide angled mirror is not adapted to directly attach to the existing rear view mirror in the passenger compartment of the vehicle, the user must engage in some elaborate attachment system to rigidly secure the auxiliary wide angled mirror. In most cases, there is no universal attachment system which enables a wide angled mirror to be attached to some existing portion of the interior compartment of an automotive vehicle in the same region as the normal rear view mirror is found.

OBJECTS OF THE INVENTION

It is, therefore, a primary object of the present invention to provide an automotive vehicle auxiliary mirror device which is capable of being attached to a first fixed structure on an automotive vehicle with a first attachment means or capable of being attached to a second fixed structure of an automotive vehicle with a second attachment means.

It is another object of the present invention to provide an automotive vehicle rear view mirror device of the type stated which is provided with a first attachment means for alternative attachment to a rigid structure in the interior passenger compartment of the automotive vehicle and a second attachment means for attachment to a second fixed structure in the interior passenger compartment of an automotive vehicle.

It is a further object of the present invention to provide a rear view mirror device of the type stated for use with an automotive vehicle and which includes an outer frame holding a plurality of longitudinally spaced apart rear view mirror panels to enable a substantially wide angled view to the rear of the vehicle in which the mirror device is used.

It is also an object of the present invention to provide a wide angled rear view mirror device of the type stated which includes a first attachment means in the form of a pair of brackets at the opposite ends of the frame for attachment to a structural portion of the automotive vehicle and a second attachment means in the form of an internally threaded nut on a rear portion of the frame of the mirror device capable of receiving a stud which is operatively connected to a windshield of the vehicle.

It is an additional object of the present invention to provide an auxiliary mirror device of the type stated which can be manufactured at a relatively low cost and which is highly efficient in its operation.

It is another salient object of the present invention to provide a mirror device of the type stated which is adapted for easy and convenient attachment to a wide variety of existing structures in conventional automotive vehicles and thereby lends itself to use in a large number of commercially available automotive vehicles.

With the above and other objects in view, my invention resides in the novel features of form, constructions, arrangement and combination of parts presently described and pointed out in the claims.

SUMMARY OF THE DISCLOSURE

The invention, in a broad aspect, relates to an auxiliary rear view mirror device which has a first mounting or attachment means capable of being secured to a fixed structure of an automotive vehicle and a second mounting means for alternatively being secured to another portion of an automotive vehicle. The auxiliary rear view mirror device more specifically is a wide angled rear view mirror which includes a plurality of longitudinally spaced apart mirror panels, usually three or more mirror panels, enabling wide angled view to the rear and the sides of the vehicle.

More specifically, the vehicle mirror assembly of the present invention comprises a mirror housing with a mirror panel carried by the housing to enable a view to the rear of the vehicle when the mirror assembly is attached to the vehicle. As indicated previously, a plurality of at least three, and preferably four or five or more, longitudinally spaced apart mirror panels are provided in the housing. In a preferred embodiment, the first mounting means is provided for securing the mirror assembly to the vehicle and alternately, the second mounting means may also be provided which may be used in conjunction with or independently of the first mounting means. The mirror assembly of the present invention may be used in place of or in addition to the existing automotive rear view mirror normally found in conventional automotive vehicles.

The first attachment means generally comprises a pair of spaced apart brackets which are adapted to be secured to a first portion of the vehicle and which brackets are adapted to be located in proximity to opposite ends of the mirror housing. These brackets may be secured to the first portion of the vehicle with mechanical fasteners, such as screws, bolts or the like. The first attachment means preferably comprises a stud extending from the housing in proximity to each of the ends of the housing. A first plate is provided for engagement with each of the studs. In this view, a stud can extend through an opening in the plate and may be secured within the plate with a nut.

The plate is then secured to the bracket by additional mechanical fasteners, such as screw and bolt assemblies, or the like. The bracket is then secured to a frame portion or other structural portion of the automotive vehicle. The plate allows some degree of adjustability when secured to the bracket and to the stud on the mirror housing. In this way, the mirror assembly can be rigidly secured to the vehicle and also provide some degree of adjustability so as to position the mirror assembly in a desired position within the passenger compartment of the vehicle.

The mirror assembly of the present invention also comprises the second attachment means which is generally located on the rear portion of the mirror housing. This second attachment means includes a rearwardly located boss on a rearwardly facing portion of the housing. An externally threaded section is associated with the boss. More specifically, this externally threaded section adopts the form of the fitting having an internally threaded bolt receiving hole located within the boss. A stud having at least one threaded end is provided for attachment to the boss and is also adapted for attachment to another portion of the automotive vehicle.

In a more preferred embodiment, the stud used with the second attachment means is provided on its opposite end with a plate adapted to be fitted within a bracket adhesively secured to the windshield of the automotive vehicle. The plate and bracket assembly for attachment to the windshield of the automotive vehicle is more fully illustrated and described in my U.S. Pat. No. 4,593,878, dated June 10, 1986.

The present invention also provides a vehicle mirror assembly which may use a single attachment means, preferably the first attachment means at each of the opposite ends of the mirror assembly housing. This type of mounting means has been found to be highly effective in that the user can easily and quickly attach the mirror housing to the vehicle without any special tooling and without any significant mechanical aptitude. Thus, the mirror assembly can be installed without the necessity of expensive skilled labor.

This invention possesses many other advantages and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Figure 7:
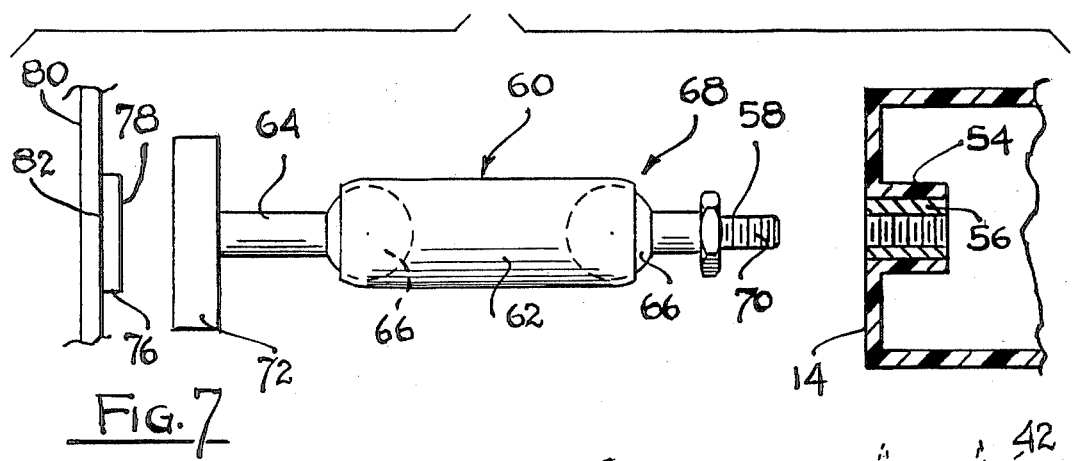
Figure 8:
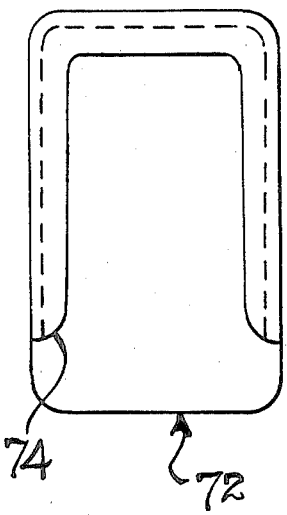
Figure 10:
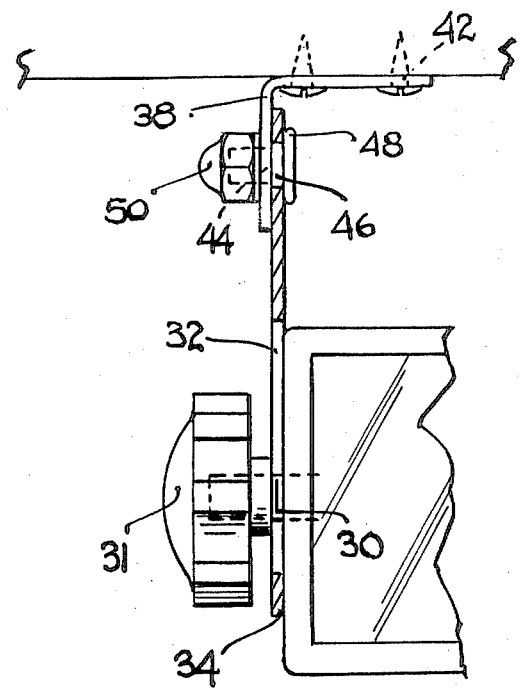
Figure 9:
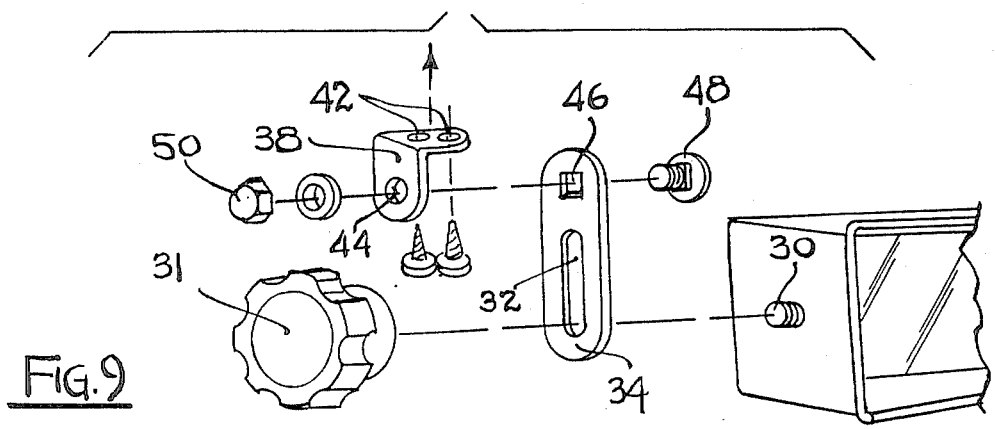

Having thus described the invention in general terms, reference will now be made to the accompanying drawings in which (three sheets):

FIG. 1 is a perspective view of a rear view mirror device constructed in accordance with and embodying the present invention;

FIG. 2 is a front elevational view of the rear view mirror device of the present invention;

FIG. 3 is an end elevational view of the rear view mirror device of the FIGS. 1 and 2 taken along the plane of line 3—3 of FIG. 2;

FIG. 4 is an end elevational view of the rear view mirror device, similar to FIG. 3, taken along the plane of line 4—4 of FIG. 2;

FIG. 5 is a rear elevational view of the rear view mirror device and showing a portion of the second attachment means;

FIG. 6 is a vertical sectional view taken along line 6—6 of FIG. 5 and showing, in more detail, a portion of the second attachment means;

FIG. 7 is a fragmentary exploded side elevational view showing components of the attachment means forming part of the rear view mirror device;

FIG. 8 is a front elevational view of a bracket forming part of the second attachment means and which is adapted to be attached to the windshield of an automotive vehicle;

FIG. 9 is a fragmentary exploded perspective view showing some of the components forming part of the first attachment means; and FIG. 10 is a fragmentary front elevational view showing the first attachment means secured to the automotive vehicle for holding the mirrored device of the present invention to a portion of the passenger compartment of the automotive vehicle.

DETAILED DESCRIPTION OF A PREFERRED EMBODIMENT

Referring now in more detail and by reference characters to the drawings which illustrate a preferred embodiment of the invention, "A" designates an auxiliary rear view mirror device which is adapted for attachment to a portion of an existing automotive vehicle and particularly in the passenger compartment of an automotive vehicle.

The rear view mirror device of the present invention is preferably a wide angled mirror device and is adapted for use in essentially all types of automotive vehicles, which includes trucks, passenger vehicles, boats, airplanes, and the like.

The rear view mirror device of the present invention differs from that mirror device described in the aforesaid co-pending patent application in that this present mirror device comprises a larger number of longitudinally spaced apart mirror panels. In this case, the mirror device may include at least three and preferably more, such as four or five or more longitudinally spaced apart mirror panels. In this way, the mirror device of the present invention enables a very wide-angled view of both the rear and the sides of the automotive vehicle, when in use. Thus, due to the substantial length of the present device, the first and second attachment means described in the aforesaid co-pending patent application is not always sufficient to rigidly hold the mirror device in an affixed position within the passenger compartment of the vehicle.

The present invention, however, does provide a first and second attachment means which are effectively used individually or in combination for securing the rear view mirror device in a fixed position within the automotive vehicle. These attachment means are uniquely adapted to preclude vibration of the mirror when the vehicle is riding upon a rough road surface. Moreover, the first and second attachment means also provide the required degree of adjustability to accommodate easy viewing by any sized operator of the vehicle.

The rear view mirror device A of the present invention generally comprises an outer housing 10 which is preferably rectangular in shape, in the manner as illustrated in FIG. 1. This housing 10 is comprised of a frame shell including a vertically disposed back wall 14 and a top wall 16 and a bottom wall 18 which are connected by spaced apart end walls 20. In this way, the frame shell forms an enclosing outer section with an interior compartment 22, in the manner as illustrated in FIGS. 1 and 2 of the drawings.

The housing 10 is provided with a plurality of longitudinally spaced apart obliquely extending vertically disposed supporting walls 34 which suitably retain rear view mirror plates or panels 36. Each of the mirror panels 36 are effectively parallel to one another although they extend obliquely with respect to the rectangularly shaped housing 10, in the manner as illustrated in FIG. 1 of the drawings. In this way, by using a plurality of the obliquely extending longitudinally spaced apart mirrors, the user of the rear view mirror device is able to achieve a wide angled view to the rear and the sides of the vehicle. The various rear view mirror panels 36, usually comprise a glass plate with a metalized surface on the rear portion thereof. Moreover, they may be secured to the walls 34 by means of an adhesive or similar mounting means.

The housing 10 can be formed of any suitable material, as for example, plastics and reinforced plastics and which are formed by suitable molding techniques. Thus, and in a preferred embodiment, the housing 10 is formed of a polyvinyl material, although they may be formed of polyethylene, polystyrene, etc. The housing 10 could also be formed of various metals and other structural materials.

The rear view mirror device of the present invention comprises a unique mounting and securement system which includes a first attachment means located at the ends of the housing and in a second attachment means located on the wall 14 of the housing. The first attachment means comprises a threaded bolt or stud 30 extending outwardly from each of the end walls 20, in the manner as illustrated in FIGS. 1-5 of the drawings. In the actual construction, a pair of first attachment means are provided and a pair of second attachment means are provided.

Inasmuch as each of the first attachment means are identical, only one of such attachment means is described in more detail herein. The stud 30 is sized to extend into an elongate opening 32 in a plate 34, the latter of which is adapted to be vertically disposed when the rear view mirror device is attached to the interior of a vehicle. Moreover, the plate 34 is captured in engagement with the end wall 20 of the housing 10 by means of a knob 36 which exists in the form of a knob. In a more preferred construction, the nut 36 is provided with an internally threaded fitting on an interior portion thereof sized to threadedly engage the threaded stud 30.

The plate 34 is arranged to be connected to an L-shaped bracket 38, in the manner as more fully illustrated in FIG. 9 of the drawings. This bracket 38 is provided with one or more apertures 40 in a horizontally disposed leg thereof for receiving mechanical fasteners such as sheet metal screws 42 to thereby become secured to a frame member in the passenger compartment of a vehicle. For example, bracket 38 may be conveniently secured to the metal frame portion surrounding the windshield of the vehicle. The vertical leg of the bracket 38 is also provided with an aperture 44 capable of being aligned with a corresponding aperture 46 in the plate 34 for purposes of receiving a bolt 48. A washer and nut arrangement 50 are also provided for engaging the threaded end of the bolt 48. In this way, the first attachment means is capable of securing one end of the rear view mirror device to the automotive vehicle, in the manner as illustrated in FIG. 10 of the drawings. As indicated previously, the opposite first fastening means is constructed in an almost identical manner and operates in an almost identical manner so as to enable the rear view mirror device to be installed in the passenger compartment of the vehicle.

A pair of second attachment means are also provided on the rear view mirror device, as aforesaid, and these second attachment means are located on the rear wall 16, also in the manner as previously described. Inasmuch as both second attachment means are substantially identical in construction and operation, only one such attachment means will be described in more detail herein by more specific reference to FIGS. 6 through 8 of the drawings.

Each second attachment means generally comprises a cylindrical shaped boss 54, in the manner as illustrated in FIG. 7 of the drawings. Thus, a pair of such cylindrically shaped bosses 54 would be located on the rear wall 14. A nut 56 is press fitted into the bore of the boss 54, in the manner as illustrated in FIG. 7 of the drawings. This nut 56 also includes an internal bore and is provided with an internally threaded section for receiving the threaded end of a bolt 58 or similar member forming part of a stud assembly 60.

The stud assembly 60 includes a centrally located housing 62 and an elongate stud section 64 at the opposite end. The stud sections 58 and 64 are integral with ball sections 66 captured in opened opposite ends of the housing 62 and form oppositely disposed conventional ball joints 68. In this case, inasmuch as the ball joints may be conventional, and merely permit the stud sections 58 and 64 to be movable relative to one other, these ball joints are neither illustrated nor described in any further detail herein.

One of the threaded stud sections 58 is externally threaded at 70 for threaded securement to the nut 56. The opposite threaded stud section 64 is provided with a bracket 72 having an internal groove 74 which is adapted to slidably engage flanges 76 on a plate 78. By further reference to FIGS. 7 and 8 it can be seen that the plate 78, which is also often referred to as a "button", is secured to an automotive vehicle windshield 80 by means of an adhesive layer 82. In this way, the rear view mirror device can also be used with the second attachment means and also can be mounted for pivotal movement.

Thus, there has been illustrated and described a unique and novel rear view mirror device for automotive vehicles which is provided with a dual mounting system and which is capable of being manufactured and assembled easily and at a relatively low cost. Thus, the present invention fulfills all of the objects and advantages which have been sought. It should be understood that many changes, modifications, variations, and other uses and applications will become apparent to those skilled in the art drawings after considering this invention. Therefore, any and all such changes, modifications, variations, and other uses and applications which do not depart from the spirit and scope of the invention are deemed to be covered by the invention which is limited only be the following claims.

Having thus described my invention what I desire to claim and secure by Letters Patent is:

1. An auxiliary vehicle mirror assembly for attachment to a first portion of a vehicle through a first attachment means or alternatively to a second portion of the vehicle through a second attachment means, said auxiliary vehicle mirror assembly comprising:
   (a) a mirror housing,
   (b) a mirror carried by said housing enabling a view to a rear of the vehicle when the mirror assembly is attached to the vehicle,
   (c) first attachment means on said housing comprising a pair of spaced apart brackets located in proximity to opposite ends of said housing for securement to a first portion of the vehicle,
   (d) second attachment means comprising a rearwardly located boss on a rearwardly facing portion of said housing, an internally threaded section in said boss facing rearwardly thereof, and
   (e) a stud having at least one threaded end for attachment in said boss and also being adapted for attachment to a member on another portion of the vehicle when said first attachment means is not used.

2. The vehicle mirror assembly of claim 1 further characterized in that said brackets are secured to the first portion of the vehicle with mechanical fasteners securing the brackets to the first portion of the vehicle.

3. The vehicle mirror assembly of claim 1 further characterized in that said stud has an opposite threaded end for attachment to a plate which is secured to the windshield of a vehicle.

4. The vehicle mirror assembly of claim 1 further characterized in that a plurality of spaced apart mirrors are carried by said housing.

5. The vehicle mirror assembly of claim 1 further characterized in that said second attachment means comprises a fitting which is carried in an interior bore of the boss and includes the internally threaded section adapted to receive a threaded end of said stud.

6. The vehicle mirror assembly of claim 5 further characterized in that a ball joint is located intermediate the opposite ends of said stud.

7. The vehicle mirror assembly of claim 6 further characterized in that one end of said stud is provided with a bracket having a slot receiving a plate for securement to an automotive vehicle windshield.

8. The vehicle mirror assembly of claim 1 further characterized in that a stud extends from said housing in proximity to each of the ends thereof and comprises a separate plate for engagement with each said stud and each said plate being adapted for attachment to a separate one of said brackets.

9. The vehicle mirror assembly of claim 1 further characterized in that each stud extends thrugh an opening in each said plate and is secured thereto.

10. The vehicle mirror assembly of claim 9 further characterized in that a nut is threadedly secured to the stud and is engageable with the plate.

11. The vehicle mirror assembly of claim 10 is further characterized in that each plate is secured to the bracket at that end by mechanical fasteners.

12. A vehicle mirror assembly for attachment to a first portion of a vehicle through an attachment means in the passenger compartment of the vehicle, said vehicle mirror assembly comprising:
   (a) a mirror housing,
   (b) a plurality of longitudinally spaced apart mirror panels carried by said housing enabling a view to a rear of the vehicle when the mirror assembly is attached to the vehicle, and
   (c) a separate attachment means in proximity to each of the opposite ends of the housing, each said attachment means comprising:
      (1) a stud extending from the housing in proximity to each of the opposite ends,
      (2) a plate for engagement with said stud,
      (3) a bracket adapted for securement to said plate, and
      (4) means for securing the bracket to a fixed portion of the vehicle in the passenger compartment thereof.

13. The vehicle mirror assembly of claim 12 further characterized in that each stud extends through an opening in each said plate and is secured thereto.

14. The vehicle mirror assembly of claim 13 further characterized in that a nut is threadedly secured to the stud and is engageable with the plate.

15. The vehicle mirror assembly of claim 14 further characterized in that each plate is secured to the bracket at that end by mechanical fasteners.

16. The vehicle mirror assembly of claim 12 further characterized in that said mirror assembly comprises:
   (a) second attachment means including a rearwardly located boss on a rearwardly facing portion of said housing,
   (b) an internally threaded section in said boss facing rearwardly thereof, and
   (c) a stud having at least one threaded end for attachment in said boss and also being adapted for attachment to a member on another portion of the vehicle.

17. The vehicle mirror assembly of claim 16 further characterized in that said stud has an opposite threaded end for attachment to a button on the windshield of a vehicle.

18. The vehicle mirror assembly of claim 17 further characterized in that said second attachment means comprises a fitting which is carried in an interior bore of the boss and includes the internally threaded section adapted to receive a threaded end of said stud.

19. An auxiliary vehicle mirror assembly for attachment to a first portion of a vehicle through a first attachment means or alternatively to a second portion of the vehicle through a second attachment means, said auxiliary vehicle mirror assembly comprising:

(a) a mirror housing,
(b) a mirror carried by said housing enabling a view to a rear of the vehicle when the mirror assembly is attached to the vehicle,
(c) first attachment means on said housing comprising a pair of spaced apart brackets located in proximity to opposite ends of said housing for securement to a first portion of the vehicle,
(d) second attachment means comprising a rearwardly located stud attachment section on a rearwardly facing portion of said housing, and
(e) a stud having at least one first end for attachment to said stud attachment section and also being adapted for attachment to a member on another portion of the vehicle when said first attachment means is not used.

20. The vehicle mirror assembly of claim 19 further characterized in that said brackets are secured to the first portion of the vehicle with mechanical fasteners securing the brackets to the first portion of the vehicle.

21. The vehicle mirror assembly of claim 19 further characterized in that said stud has a second end for attachment to a plate which is secured to the windshield of a vehicle.

22. A vehicle mirror assembly for attachment to a first portion of a vehicle through an attachment means in the passenger compartment of the vehicle, said vehicle mirror assembly comprising:

(a) a mirror housing,
(b) a plurality of longitudinally spaced apart mirror panels carried by said housing enabling a view to a rear of the vehicle when the mirror assembly is attached to the vehicle, and
(c) a separate attachment means on a rearward portion of the housing, said separate attachment means comprising:
 (1) a stud extending from the housing in proximity to each of the opposite ends,
 (2) a plate for engagement with said stud,
 (3) a bracket adapted for the securement to said plate, and
 (4) means for securing the bracket to a fixed portion of the vehicle in the passenger compartment thereof.

23. The vehicle mirror assembly of claim 22 further characterized in that said stud extends through an opening in said plate and is secured thereto.

* * * * *